Sept. 9, 1924.                     W. ROBINSON                     1,508,028
                              WATER DISTRIBUTING DEVICE
                                 Filed Jan. 20, 1922
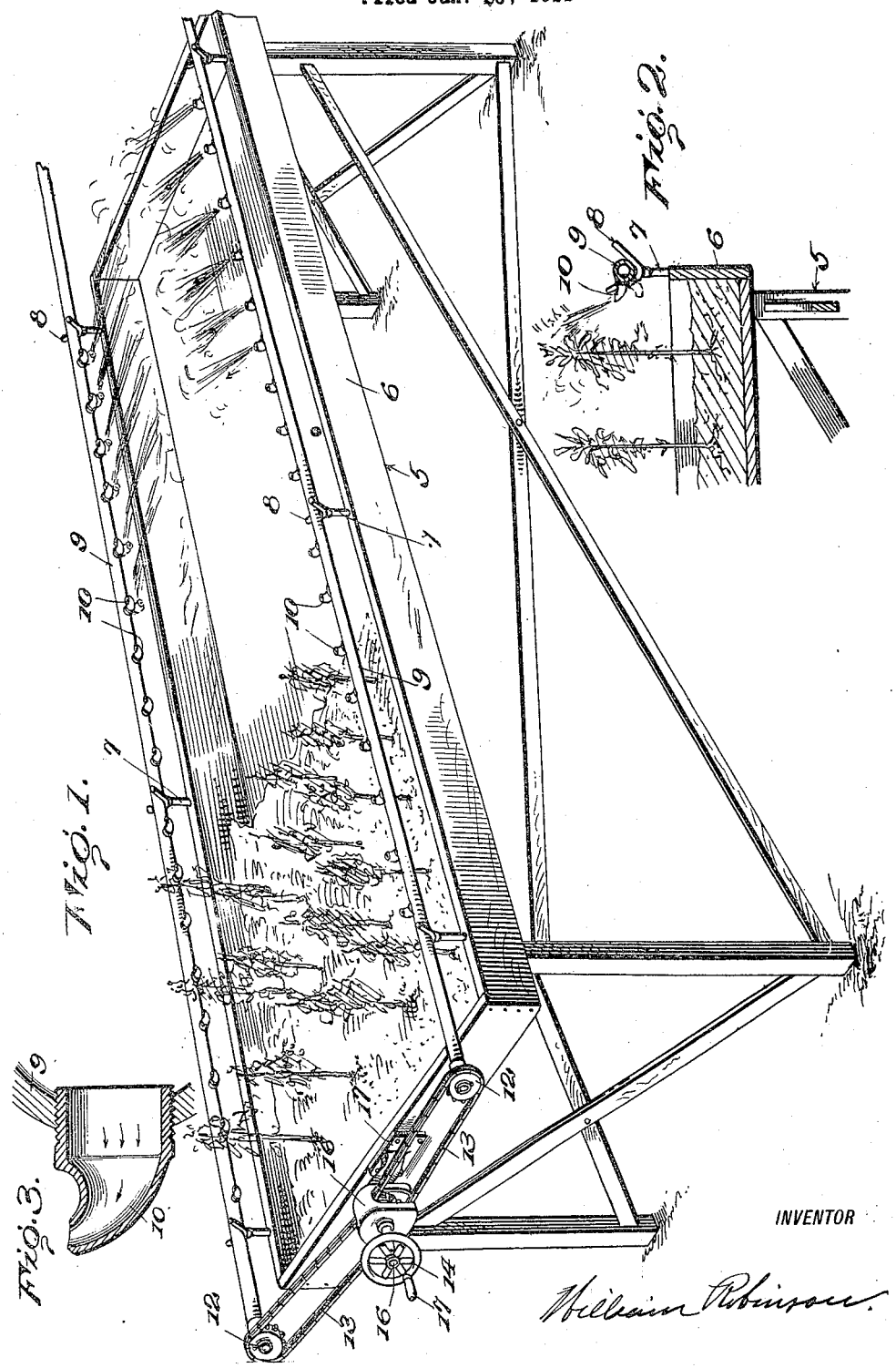
INVENTOR
William Robinson.

Patented Sept. 9, 1924.

1,508,028

UNITED STATES PATENT OFFICE.

WILLIAM ROBINSON, OF MORTON GROVE, ILLINOIS.

WATER-DISTRIBUTING DEVICE.

Application filed January 20, 1922. Serial No. 530,590.

*To all whom it may concern:*

Be it known that I, WILLIAM ROBINSON, a citizen of the United States, residing at Morton Grove, in the county of Cook and State of Illinois, have invented certain new and useful Improvements in Water-Distributing Devices, of which the following is a specification.

This invention relates to improvements in water distributing devices especially adapted for use in watering hot house plants.

An important object of this invention is to provide a flower table for hot houses having a pair of oppositely arranged water distributing mains or pipes provided with special nozzles having discharge ends arranged at angles of 45 degrees which direct the water upwardly on to the under side of the plants for thoroughly watering and syringing the same under high pressure for the purpose of removing any insects which might be lodged on the plants. This arrangement is also valuable for general watering and soaking of the plants.

A further object of the invention is to provide a water distributing means for hot house flowers embodying a pair of pipes arranged on opposite sides of the table and having novel means whereby the same may be manually rotated together thereby reducing the work of the attendant to a mimimum and permitting the flowers to be watered after the heat of the day as it would be very expensive to require an attendant to remain at the hot house in the evening to water the plants.

Other objects and advantages of the invention will be apparent during the course of the following description.

In the accompanying drawing forming a part of this application and in which like numerals are employed to designate like parts throughout the same, Figure 1 is a perspective of a hot house table equipped with the improved water distributor.

Figure 2 is a detail vertical sectional view through the distributor applied.

Figure 3 is a detail section of a nozzle embodied in the invention.

In the drawing wherein for the purpose of illustration is shown a preferred embodiment of the invention the numeral 5 designates a table having spaced sides 6 which confine the soil upon the table and which form a supporting means for a plurality of standards 7, the upper ends of the standards being forked as indicated at 8 to form seats for a pair of longitudinally extending water distributing pipes 9. The water distributing pipes are provided with nozzles 10 projecting laterally, spaced approximately eight inches apart and having their end portions extending angularly and flattened so that the water upon being discharged will be directed upwardly and inwardly onto the underside of the plants for thoroughly and uniformly syringing or watering the same, a very necessary operation in caring for cut flowers.

The water distributing pipes 9 may be supplied with water from any suitable source and each pipe has one end provided with a sprocket wheel 12 having connection with a sprocket chain 13.

The sprocket chains 13 of which there are two are trained about sprocket wheels keyed or otherwise secured to an operating shaft 14, said operating shaft being extended through a housing 15 secured to one end of the table by means of a bracket 17. The shaft 14 may be manually rotated by means of an operating wheel 15 having a handle 17 adapted to be engaged by the operator when it is desired to rotate the distributing pipe 9.

In operation the flow of water through the water distributing pipes 9 is set up and the operator may rotate the hand wheel 16 so that the nozzles will be moved about the longitudinal axis of each of the pipes 9. By reason of this arrangement all portions of the plants are thoroughly and uniformly watered or syringed.

When the water distributing system is not in use the nozzles 10 may be arranged downwardly beneath the pipes 9 by a suitable operation of the hand wheel 16. When the nozzles 10 are arranged beneath the pipes 9 the same are out of the way of the attendant so that the soil carried by the table 5 may be effectively worked or the tables refilled without clogging the nozzles.

A water distributing system constructed in accordance with this invention greatly reduces the work of the attendant and permits the flowers to be thoroughly and uniformly worked.

It is obvious that the pipes 9 are connected to convenient water supply mains and that any suitable means such as a pump may be employed for increasing the pressure of the water.

I claim:—

1. A water distributing apparatus for hot house plants comprising a pair of spaced parallel water distributing pipes having inwardly directed nozzles, sprocket wheels secured on the ends of said water distributing pipes, sprocket chains trained about said wheels respectively, and means to operate said sprocket chains for simultaneously rotating said water distributing pipes in opposite directions.

2. In a water distributing apparatus for hot house plants comprising a pair of spaced parallel water distributing pipes having inwardly directed nozzles, sprocket wheels secured on the ends of said water distributing pipes, a shaft intermediate said spaced distributing pipes and parallel thereto, sprocket wheels upon said shaft, a sprocket chain trained about the sprocket wheel upon each water pipe and a respective sprocket wheel on the shaft, and means upon the said shaft to rotate the same.

In testimony whereof, I have affixed my signature in the presence of three witnesses.

WILLIAM ROBINSON.

Witnesses:
 JUDD H. MATTHEWS,
 MIRIAM B. ROBINSON,
 FRANK J. ROBINSON.